US006890489B2

(12) United States Patent
Nichols et al.

(10) Patent No.: US 6,890,489 B2
(45) Date of Patent: May 10, 2005

(54) MASS RATE ATTENUATOR

(75) Inventors: Jon A. Nichols, Forestville, CA (US); Marc D. Foster, Rohnert Park, CA (US)

(73) Assignee: Rheodyne, L.P., Rohnert Park, CA (US)

( * ) Notice: Subject to any disclaimer, the term of this patent is extended or adjusted under 35 U.S.C. 154(b) by 394 days.

(21) Appl. No.: 09/835,198

(22) Filed: Apr. 13, 2001

(65) Prior Publication Data

US 2001/0038071 A1 Nov. 8, 2001

Related U.S. Application Data

(60) Provisional application No. 60/199,748, filed on Apr. 26, 2000.

(51) Int. Cl.[7] ............................ B01L 11/01; G01N 1/10

(52) U.S. Cl. ................. 422/103; 73/864.12; 73/863.72; 73/422

(58) Field of Search ................................ 422/102, 103; 251/289, 213, 129.01, 304, 149; 73/15.22, 265, 1.84, 863.56, 864.83, 863.72, 863.82, 863.73, 864.12, 864.81, 863.86; 137/869, 885, 215

(56) References Cited

U.S. PATENT DOCUMENTS 3,222,135 A * 12/1965 Ashmead .................... 422/103
3,404,780 A * 10/1968 Junger ........................ 210/142
3,549,994 A * 12/1970 Rothermal et al. ........ 324/71.1
3,567,389 A * 3/1971 Coulter et al. .............. 422/103
3,567,390 A * 3/1971 Rothermal .................. 422/103
3,645,142 A * 2/1972 Turpin ..................... 73/864.12
3,840,341 A * 10/1974 Rogers ....................... 436/146
3,885,439 A * 5/1975 Stone ...................... 73/863.73
3,948,104 A * 4/1976 Stephens ................. 73/863.84
3,990,853 A * 11/1976 Godin ........................ 422/100
4,057,393 A * 11/1977 Budzak et al. .............. 436/141
4,120,661 A * 10/1978 Naono ........................ 422/100
4,152,391 A * 5/1979 Cabrera ...................... 422/103
4,182,184 A * 1/1980 Bakalyar et al. ......... 73/864.87
4,506,558 A * 3/1985 Bakalyar ................. 73/863.72
4,507,977 A * 4/1985 Cabrera ................... 73/864.12
4,520,108 A * 5/1985 Yoshida et al. ............... 436/52
4,645,647 A * 2/1987 Yoshida et al. ............... 422/81
4,702,889 A * 10/1987 Cabrera et al. ............. 422/103
4,726,237 A * 2/1988 Yung ....................... 73/864.83
4,726,932 A * 2/1988 Feier et al. ................. 422/103
4,822,569 A * 4/1989 Pellegrino ................... 422/103
4,836,038 A * 6/1989 Baldwyn ................. 73/864.21
4,896,546 A * 1/1990 Cabrera et al. .......... 73/863.73
4,948,565 A * 8/1990 Bemis et al. ............... 422/103
4,957,008 A * 9/1990 Proni et al. .............. 73/864.83
5,083,742 A * 1/1992 Wylie et al. ............... 251/61.1
5,207,109 A * 5/1993 Olsen ...................... 73/863.73
5,250,263 A * 10/1993 Manz .......................... 422/81
5,270,212 A * 12/1993 Horiuchi et al. .............. 436/45
5,390,552 A * 2/1995 Demachi et al. ......... 73/863.73
5,447,691 A * 9/1995 Sanuki ........................ 422/100
5,524,496 A * 6/1996 Nagai et al. ............. 73/863.73
5,542,305 A * 8/1996 Hollinger ................. 73/863.73
6,096,276 A * 8/2000 Laursen ...................... 422/103
6,228,652 B1 * 5/2001 Rodriguez et al. ............ 436/63
6,234,207 B1 * 5/2001 Toyama ................. 137/625.43
6,269,838 B1 * 8/2001 Woodworth et al. ... 137/625.22
6,352,577 B1 * 3/2002 Martin et al. .................... 96/4
6,374,860 B2 * 4/2002 Xu et al. .................... 137/884
6,453,725 B1 * 9/2002 Dahlgren et al. .......... 73/23.42

* cited by examiner

*Primary Examiner*—Jill Warden
*Assistant Examiner*—Jyoti Nagpaul
(74) *Attorney, Agent, or Firm*—Beyer Weaver & Thomas LLP

(57) ABSTRACT

While a large primary stream (24) of analytes flow from a chromatographic column (20) to containers of a receiver (108), small samples of the analytes are diverted for flow to a mass spectrometer (54) for analysis, by use of a transfer module (102). The transfer module includes a stator (110) and a rotor or shuttle (114). The shuttle has an aliquot passage (120) that initially lies in a first position where the primary stream flows through it so the aliquot passage receives a small sample. The shuttle then moves to a second position where the aliquot passage (at 122) is aligned with a pump (134) that pumps fluid out of the aliquot passage to the mass spectrometer.

32 Claims, 5 Drawing Sheets

FIG. 5
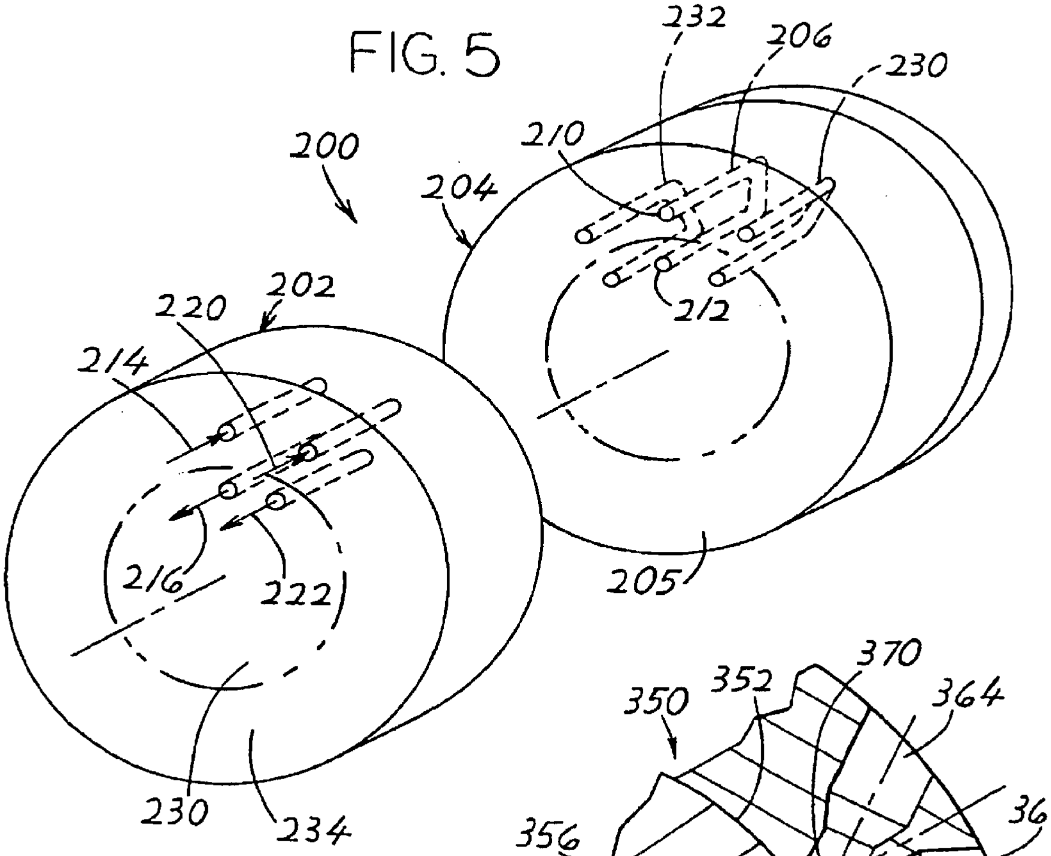
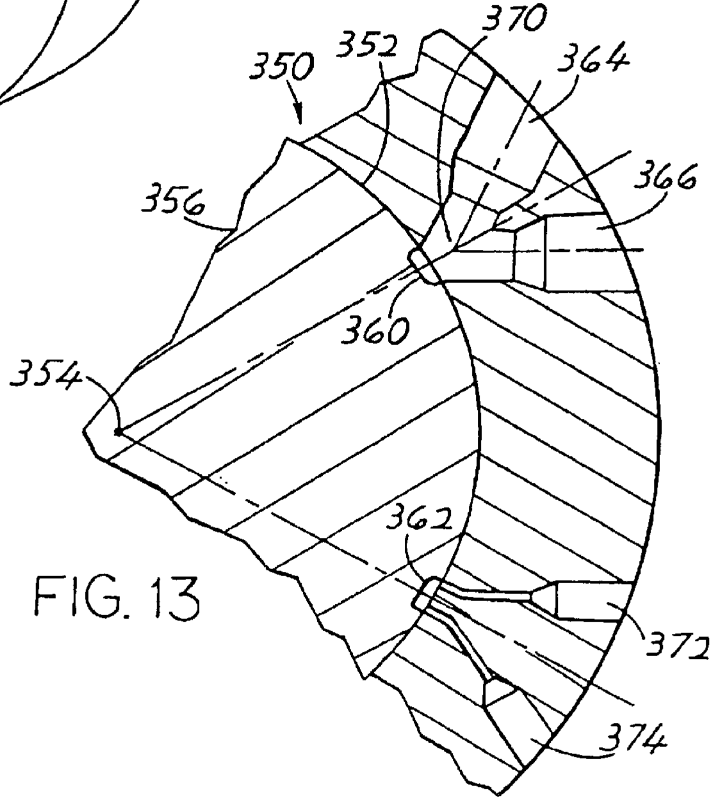
FIG. 13

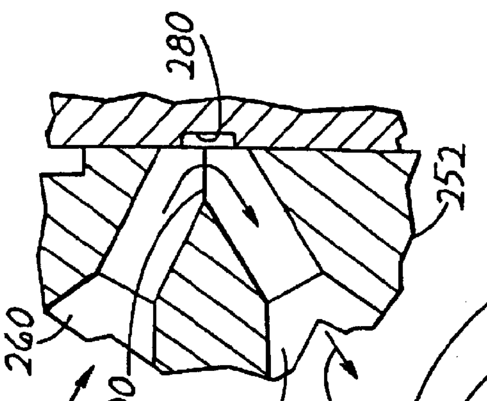
FIG. 7
FIG. 6
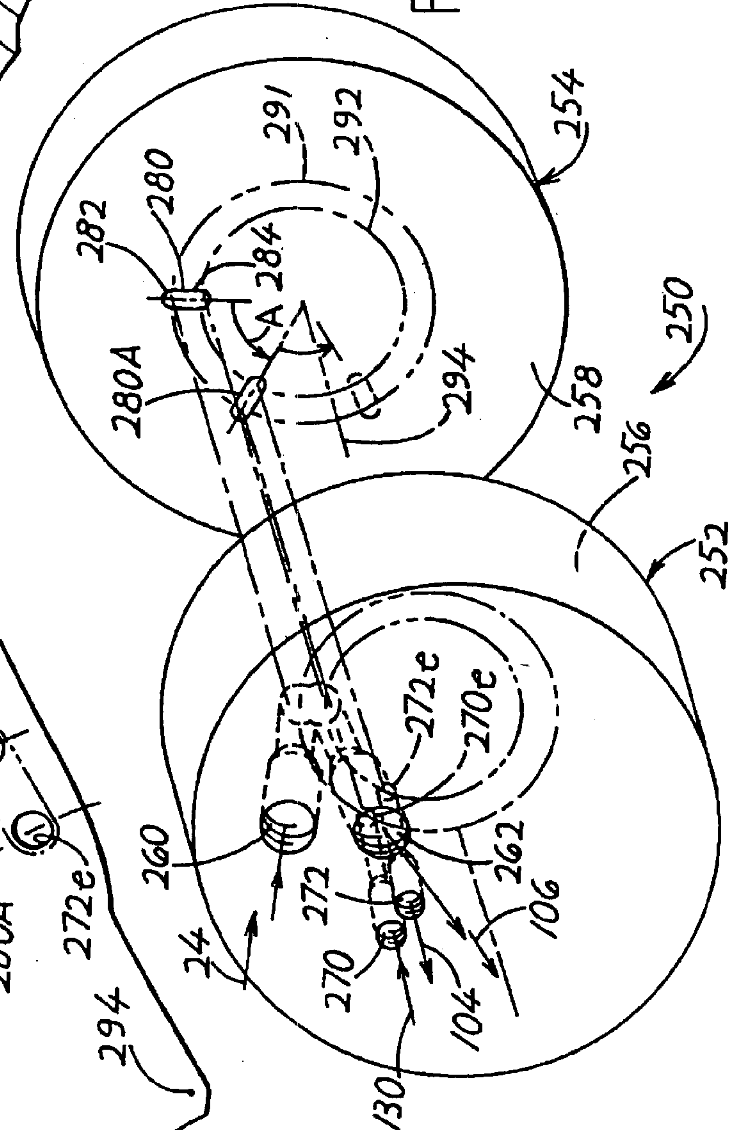
FIG. 8
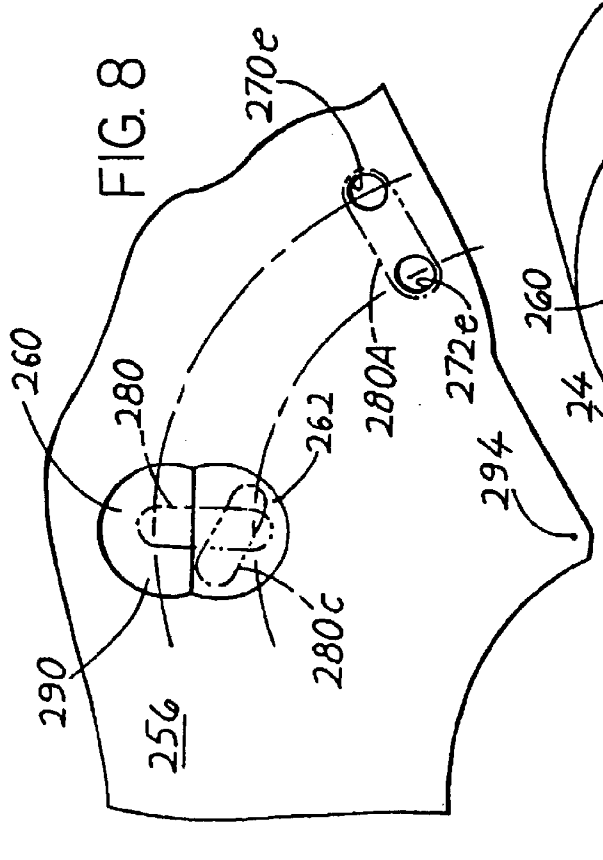

MASS RATE ATTENUATOR

CROSS-REFERENCE TO RELATED APPLICATION

Applicant claims priority from Provisional Patent Application No. 60/199,748 filed Apr. 26, 2000.

BACKGROUND OF THE INVENTION

A mixture of compounds, or analytes, can be separated by pumping the mixture through a separating device such as a chromatographic column. The outflow from the column may continue for perhaps several minutes, during which analytes of different molecular weights flow out at different times. Each analyte may flow out for a period such as a fraction of a minute. The analytes are delivered to a receiver where each analyte is stored in a separate container. At the same time as the column output is flowed to the receiver, a small amount of the column outlet is flowed to a mass spectrometer which indicates the molecular weight of each analyte. A prime use for the invention is to facilitate the purification of a synthesized compound during the development of a new drug. The products of the synthesis includes the desired synthesized compound (whose molecular weight is known), reactants and side products, all of which can be referred to as analytes.

In order for the mass spectrometer to function optimally, there should be a controlled low mass rate of analyte flowing into it. Such mass or flow rates should be easily adjustable and closely controllable despite variations in the flow rate of fluid passing through the column. The flow rate should be reproducibly controlled, which makes it easier for the mass spectrometer to unambiguously identify the collection vessel in which the desired synthesized compound should reside. It should be possible to select a desired carrier fluid to pump a predetermined volume, or fraction, of the analyte into the mass spectrometer, where the carrier fluid is different from the mobile phase used to pump the synthesized compound through the column. This is important because certain mobile phase fluids used in chromatographic columns contain dissolved buffer salts which can cause fouling of the mass spectrometer, and certain organic components of the mobile phase can inhibit optimum ionization of the analytes which is required in a mass spectrometer. In addition, the analyte mass transfer rate into the mass spectrometer should be very small, and generally should be a small fraction of the total analyte flow rate through the column. The analyte mass rates that flow from a preparative chromatographic column are inherently large, but the mass spectrometer does not tolerate a large analyte mass rate. A large mass rate can result in a lingering or tailing signal that distorts the results of a mass spectrometer, and a large mass rate can change the dielectric properties of the system and cause a momentary loss of signal.

Thus, a device that could separate out a very small but closely controlled portion of a large primary stream for flow of the portion along a secondary path, would be of value.

SUMMARY OF THE INVENTION

In accordance with one embodiment of the present invention, a transfer module is provided for passing a small portion of a high flow rate primary stream of dissolved analytes along a secondary path leading to an analyzer for analysis of the analytes. The transfer module includes a stator having a pair of primary stator passages and a pair of secondary stator passages. The module also includes a shuttle with an aliquot passage that has opposite end por tions and that can move between first and second shuttle positions. The opposite end portion of the aliquot chamber are each aligned with one or both of the primary stator passages in the first shuttle position, so that a flow from one primary passage to the other primary passage results in the aliquot passage being filled with a portion of such flow. In the second shuttle position, the aliquot passage opposite end portions are each aligned with a different one of the secondary stator passages. This allows a carrier fluid to be pumped through the secondary passages and the aliquot passage for flow to the analyzer.

In one mass transfer module, there is a single interface between the stator and shuttle. The first and second primary passages merge at a bypass region that is open to the interface. This allows a large flow between the primary and secondary passages without requiring such flow to pass through the aliquot passage, while allowing such flow to quickly fill the aliquot passage. The aliquot passage can be formed by a groove in the face of the shuttle, so it can be quickly filled.

The novel features of the invention are set forth with particularity in the appended claims. The invention will be best understood from the following description when read in conjunction with the accompanying drawings.

BRIEF DESCRIPTION OF THE DRAWINGS

FIG. 5 is an exploded isometric view of a transfer module of another embodiment of the invention.

FIG. 6 is an exploded isometric view of a transfer module of another embodiment of the invention.

FIG. 7 is a partial sectional view of the module of FIG. 6 in its assembled condition.

FIG. 8 is an elevation view of the stator face of the module of FIG. 6.

FIG. 13 is a sectional view of a portion of a transfer module of another embodiment of the invention

DESCRIPTION OF THE PREFERRED EMBODIMENTS

Figure 1:
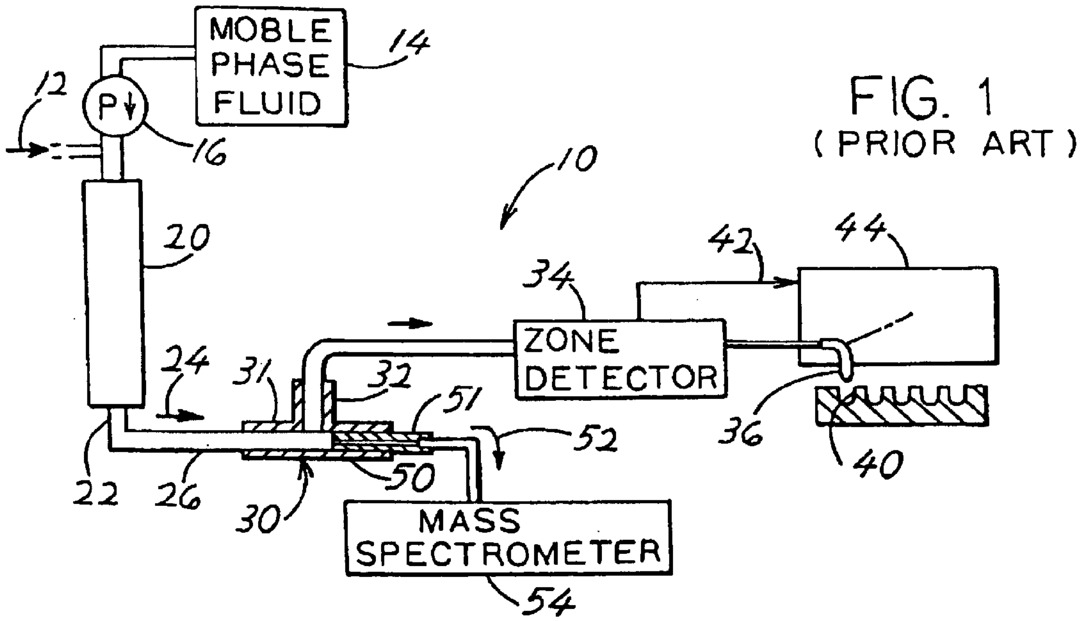
FIG. 1 (PRIOR ART)
FIG. 1 is a schematic diagram of a prior art separating and analyzing system.

FIG. 1 shows a prior art separating and analyzing system 10 in which a sample 12 with components to be separated, is injected into a stream of mobile phase fluid emanating from a source 14 and pump 16 and flowed into a preparatory chromatographic column 20. The fluid passing through the column is separated by the column into compounds, or components, of different molecular weights. The output 22 of the column is a primary stream 24 that passes along a tube 26 into a first leg 31 of a Tee connector 30. A second leg 32 of the connector carries almost all of the fluid passing along the primary stream, to a zone detector 34. The zone detector 34, which may be an ultraviolet detector, detects when zones containing different compounds pass through it. The flow through the zone detector passes through a nozzle 36 which deposits the sample into a selected one of many containers 40. Whenever the zone detector detects a new compound, it delivers a signal along line 42 to a positioner 44 that repositions the nozzle or the containers, to deposit the compounds into different containers.

A small portion of the primary stream 24 emanating from the column 20, passes through a third leg 50 of the Tee connector through a narrow tube 51 that lies in the third leg. This creates a secondary stream 52 which may include perhaps 1% of the flow rate through the primary stream 24. The secondary stream moves to a mass spectrometer 54 where the molecular weight of the compound is determined.

The primary stream 24 may contain several zones, with each zone passing a point along the tube 26 for a period of perhaps 5 to 20 seconds before a next zone containing another compound reaches that point along the tube 26. Of course, these are just examples, and the actual quantities can vary greatly. A common flow rate along the primary stream 24 is 30 mL/min, or 500 $\mu$L/sec. A common flow rate along the secondary stream 52 may be less than 1% of the primary flow. The ratio between these flow rates, called the split ratio, was previously achieved by placing the narrow tube 51 within the secondary stream.

The approach of the prior art shown in FIG. 1 has many disadvantages. In order that the mass rate along the secondary stream 52 be a small fraction of the primary stream, the diameter of the passage in the tube 51 had to be very small, which could cause partial or complete plugging. The flow rate of the carrier fluid along the secondary stream 52 could not be easily adjusted. It could be adjusted only by substituting a new tube 51 for a previous one. The flow rate along the secondary stream 52 could not be reproducibly controlled with high reliability. Partial blocking of the tubes leading from the second or third legs 32, 50 could change the split ratio and therefore the flow rate along the secondary stream 52. The composition of a carrier fluid (the mobile phase fluid 14) that carried the analyte through the mass spectrometer, and the fluid for pumping the secondary stream through the mass spectrometer, could not each be optimized, because they had to be the same. The analyte mass transfer rate into the mass spectrometer could not be readily made very small (a small fraction of 1%), for the reasons discussed above. The present invention avoids the above disadvantages.

Figure 2:
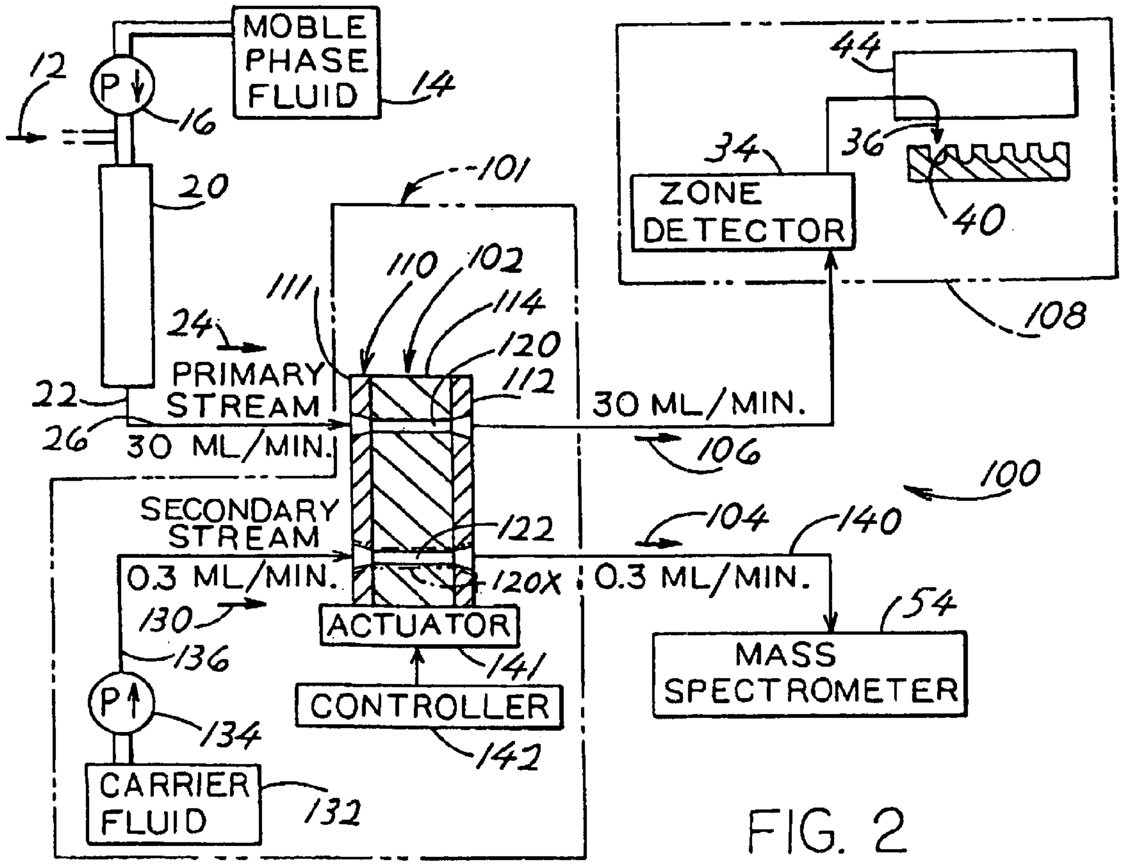
FIG. 2 is a block diagram of a separating and analyzing system of an embodiment of the present invention.

FIG. 2 shows a separating and analyzing system 100 of the present invention, that avoids the disadvantages listed above for the prior art system of FIG. 1. The system 100 comprises a mass rate attenuator 101 that includes a transfer module 102, and a frequency controller 142 that controls operation of an actuator 141 that operates the transfer module. The system also includes a secondary stream pump 134 (or source of pressured carrier fluid) that pumps a carrier fluid from a source 132 through a carrier fluid tube 136 and through the transfer module, and a transfer tube 140 that carries a secondary flow 104 to the mass spectrometer 54. In this system, the transport of analytes (compounds in the stream from the column 20) into the mass spectrometer is accomplished by a secondary stream 130 that is distinct from the primary stream 24 that represents the output of the chromatographic column 20. The transfer of analytes from the primary stream 24 to the secondary path 104 is accomplished by the transfer module 102. It may be noted that when an analyte is present in a column effluent at 22, the analyte may constitute perhaps 4% of the mass of the stream, with the rest being the mobile phase fluid 14.

In the system of FIG. 2, the sample inlet 12, mobile phase fluid source 14, pump 16, column output 22 and tube 26 that carries the primary stream 24, are all the same as in the prior art shown in FIG. 1. However, instead of the Tee connector, the system uses the transfer module 102 which works in association with the pump 134, the carrier fluid tube 136 and the transfer tube 140 to deliver analyte to the mass spectrometer 54 for analysis. The transfer module 102 creates a small secondary flow of analyte along a secondary path 104 to the mass spectrometer 54. This occurs while flowing most of the primary stream 24 along a main path 106 to a receiver 108. The receiver, which receives most of the analyte, includes the zone detector 34, the nozzle 36, the containers 40, and the positioner 44 that positions the nozzle.

The transfer module 102 includes a stator 110 with two stator parts 111, 112 and a rotor 114. The rotor has a pair of passages 120, 122. A first passage 120 is an aliquot chamber or passage which initially lies in a first position at 120, in line with the primary stream 24 and the main path 106. As fluid moves along the primary stream 24, such fluid, with analyte in it, fills the aliquot passage 120 while it lies in its first position. The rotor 114 then rotates until the aliquot passage 120 occupies a second position **120*x* previously occupied by a flowthrough passage 122. A third passage (not shown) in the rotor 114 allows the primary stream 24** to continue to flow while the rotor is in the second position.

With the aliquot passage 120 at the second position **120*x* which was previously occupied by the flowthrough passage 122, a secondary stream 130 flows through the aliquot passage at 120*x*. The secondary stream 130 is created by pumping a carrier fluid from the source 132 through the pump 134, and through the carrier fluid tube 136 to the transfer module. The secondary stream 130 flows through the aliquot passage (at the position 122) and through the transfer tube 140 along a secondary path 104 to the mass spectrometer 54. In one example, analyte passing along the primary stream 24 will pass through a point such as the column outlet 22, for a period of about 5 to 20 seconds, with the stream 24 moving at a mass rate of 30 mL/min, or 500 $\mu$L/sec. In this example, the aliquot passage 120 has a volume of 0.6 $\mu$L. As a result, when the aliquot passage 120 is placed in series with the primary stream 24, the aliquot passage will quickly fill with the mobile phase (with an analyte mixed in therewith). After the aliquot passage is filled, the rotor 114 is quickly turned to move the aliquot passage to the position at 120*x***.

With the aliquot passage at 122 and filled with the mobile phase and analyte, the contents of the aliquot passage is ready for movement along the secondary path 104. The secondary stream 130, which flows at a rate of 0.3 mL/min, or 5 $\mu$L/sec, will push analyte and mobile phase out of the aliquot passage at 122 toward the spectrometer. As soon as the transfer mobile phase with analyte is flowed out of the aliquot passage at the position **120*x*, the rotor is turned back to the original first position where the aliquot passage 120 is aligned with the primary stream 24**, where it will again be filled with a mobile phase (with analyte).

In the above example, the rotor can be switched back and forth during any period ranging from perhaps 0.1 to 10 seconds, or in other words, on an order of magnitude of one second. About the time that the results from the mass spectrometer 54 are received, the zone detector 34 is detecting the analyte zone and the output of the mass spectrometer reports the molecular weight of the analyte to a data system.

The flow of fluid through the aliquot passage 120 (at second position 120*x*) and through a tube 140 is essentially laminar. That is, the fluid velocity down the axis of the passage or tube is twice the average velocity, with the fluid velocity at the wall of tube being zero. The envelope of fluid velocity vectors across the diameter of the tube is the bullet shape that is well known in the field of hydrodynamics. Consequently, the contents of the aliquot passage do not exit into the transfer tube as a well defined plug zone, but rather as a zone that disburses and that continues to disburse as it travels along the transfer tube 140. Thus, the contents of the aliquot passage becomes smeared out along the length of the tube 140. If the aliquot passage is cycled between its two positions with a high enough frequency, the result is a continuous mass flow of analyte into the mass spectrometer.

In one set of experiments conducted with a transfer module of the type shown in FIG. 2, the aliquot passage volume was between 0.1 $\mu$L and 1 $\mu$L, with a volume of 0.6 $\mu$L being assumed in the following discussion. This occurred where the flow rate through the preparative column 20 was 30 mL/min (500 $\mu$L/sec). The flow rate along the secondary stream 130 was 300 $\mu$L/min (5 $\mu$L/sec). In the absence of dispersion, one would expect the aliquot passage 120 to be swept out in about 0.12 second, although due to dispersion the flush out time is somewhat longer and a somewhat longer time is allowed. The transfer tube 140 had an inside diameter of 0.005 inch and was four inches long, so it contained 1.3 $\mu$L. We have found experimentally, that under these conditions the frequency of aliquot transfer could be varied between one aliquot every four seconds and two aliquots per second, to obtain good results.

The rate of analyte mass transferred to the mass spectrometer can be controlled not only by the transfer frequency, but also by the dwell time in the second position and the flow rate of the secondary stream. The analyte mass rate flowing to the mass spectrometer can be reduced to extremely low values, even when using an aliquot passage that is not very small, by minimizing the dwell time and flow rate. Extremely low analyte mass rate is achieved with short dwells in the second position and/or low flow rate of the secondary stream resulting in aliquot transfers less than the aliquot volume for each cycle, while producing a largely uniform flow rate of analyte into the mass spectrometer.

The actuator 141, which is typically a stepping motor, can move the rotor to change the aliquot passage position from 120 to 120*x* and vice versa, in less than 0.1 second. Thus, most of the time the aliquot passage lies in one or the other of the two positions. In the above experiments, the position of the rotor was switched at a frequency of between 2 per second to one per four seconds, with each switching including back and forth movement. As a result of such operation, the concentration of analyte reaching the mass spectrometer at the end of the transfer tube varied about proportionally with the variation in analyte concentration along the primary stream 24. While the prior art can be characterized by the split ratio of the flow rate, the mass rate attenuator of this invention can be characterized by a mass rate ratio. The mass rate ratio is the ratio between the mass transfer rate (which can be expressed in units of $\mu$g/sec, where g is grams), along the secondary path 104 that flows to the mass spectrometer, as a fraction of the mass transfer rate in the primary stream 24 that emerges from the column 20. As previously mentioned, the ratio is large if the mass transfer rate entering the mass spectrometer is to be low enough to provide good performance. With a primary stream flow of 500 $\mu$L/sec, an aliquot passage volume of 0.6 $\mu$L, and a rotor back and forth movement rate of 2 per second, the ratio was 417 to 1. If the cycle frequency is reduced to one per second, than the mass rate ratio drops to 833 to 1. Experimental measurements at all of these cycle frequencies, has demonstrated that the observed mass rate reductions correspond closely to those predicted. In substantially all cases, the aliquot passage is switched at a frequency of between 10 per second and 0.2 per second (once per 5 seconds), to distribute the analyte largely uniformly at the inlet of the mass spectrometer.

Figures 3, 4:
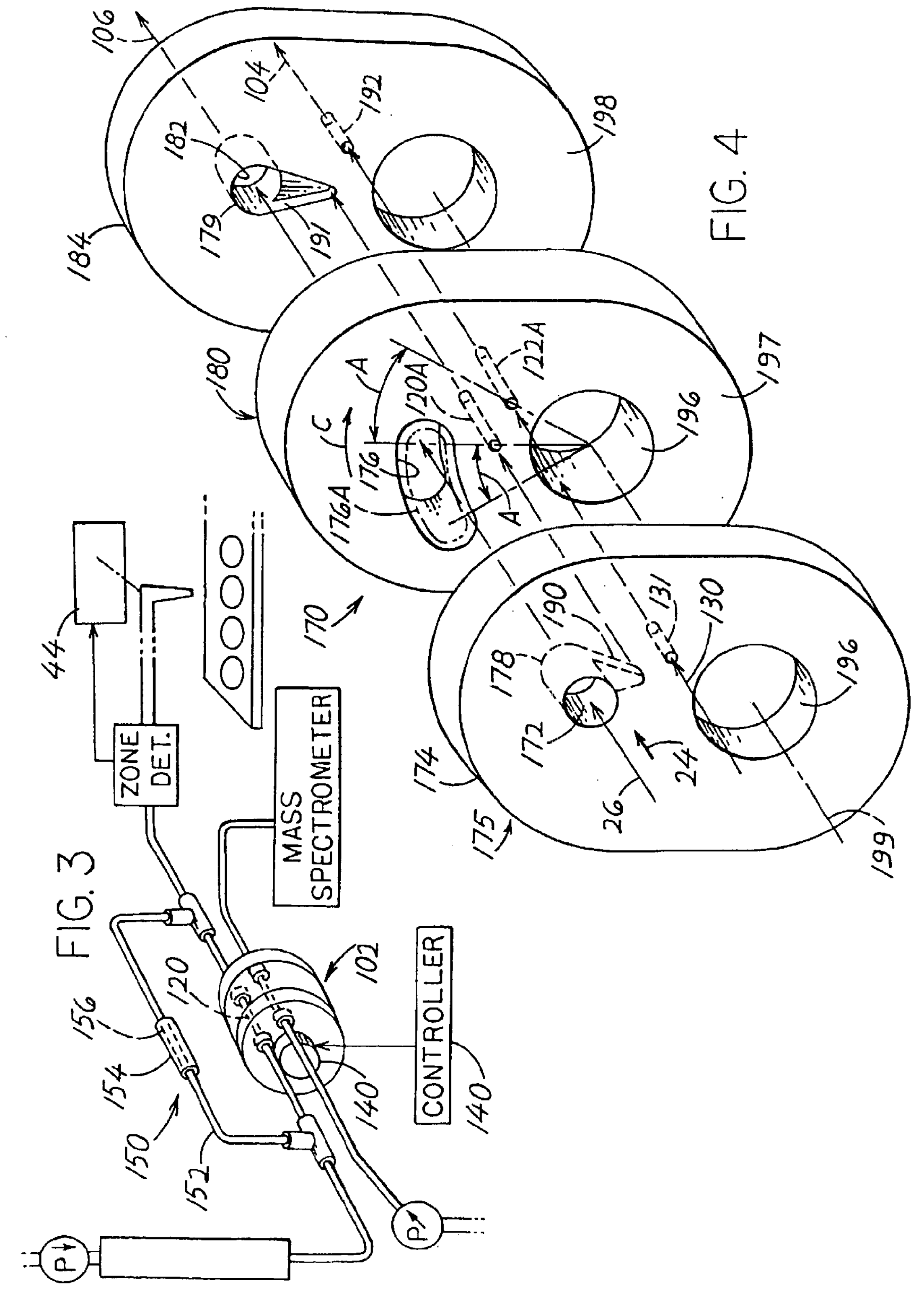
FIG. 3 is a partially isometric view of a separating and analyzing system of another embodiment of the invention.
FIG. 4 is an exploded isometric view of a transfer module of another embodiment of the invention.

One problem encountered with a transfer module of a type shown at 102 in FIG. 2, is that the diameter of the aliquot passage 120 is still too small to flow almost all of the primary stream along the main path 106 at any reasonable pressure drop. To avoid this, applicant provides a bypass path. FIG. 3 shows an example where a bypass device 150 is provided in addition to the transfer module 102 of the type shown in FIG. 2. The bypass device 150 includes a pipe 152 having a much greater diameter than the diameter of the aliquot passage 120. This allows a considerable continuous flow (e.g. 30 mL/min or 500 $\mu$L/sec) without a large pressure drop, by directing most of the flow through the bypass device 150. A restrictor 154 includes a restriction tube 156 that assures that there is at least a moderate pressure drop through the restrictor, to assure that there is a moderate flow rate through the aliquot passage 120.

FIG. 4 shows a transfer module 170 wherein the bypass function is incorporated in the same device that forms the aliquot passage at 120A. The transfer module includes a stator 175 with two parts 174, 184 and a rotor 180. The primary stream 24 passes from the column along a tube 26 to a primary passage inlet 172 of the stator first part 174. A high flow proximal end 178 of the first primary passage is aligned with a high flow passage 176 in the rotor 180. The passage in the rotor is aligned with a high flow proximal end 179 of a second primary passage 182 in the second stator part 184. Although the rotor can turn by a predetermined angle A such as 60° between its two extreme positions, the passage 176 is always in communication with the inlet and outlet 172, 184. As a result, there is a constant large flow from the primary stream 24 to the main path 106, which commonly carries more than 99% of the volume of the primary stream.

The first stator 174 has a channel 190 forming a lowflow end part, that carries a small portion of the primary stream into a position in alignment with the aliquot passage in its first position 120A. This allows some of the fluid passing along the primary stream 24, to pass through the channel 190, through the aliquot passage 120A, through another lowflow end part or channel 191, and to the highflow second passage 182 and to the main path 106. This flow fills the aliquot passage 120A with a small portion of the primary stream. When the rotor 180 is turned clockwise C by the angle A, the aliquot passage 120A moves to the position previously occupied by the flowthrough tube at 122A. Then, the aliquot passage is in line with the secondary stream 130. Flow along the secondary stream 130 and through one secondary passage 131, pushes the aliquot of fluid in the aliquot passage, out through another passage 192 and along the secondary path 104 to the mass spectrometer.

The volume of the aliquot passage 120A may be the same volume as the aliquot chamber 120 in FIG. 2 (e.g. 0.6 $\mu$L). An advantage of the transfer module 170 of FIG. 4 over that of FIG. 3, is that the division of the primary stream 24 into the portion that fills the aliquot passage at 120A and the portion that continues along the main path 106, occurs at a location at the channel 190, which is very close to the primary stream 24. If the velocity through the main path 106 and the secondary path 104 is the same, then, with knowledge of the passage time to the zone detector and sample containers and the passage time to and through the mass spectrometer, there can be more certain knowledge as to what particular analyte is passing through the zone detector 34 when the output of the mass spectrometer is available, to better match them.

The width of the rotor passage 176 can be partially restricted as by using a smaller passage 176A, to create a more rapid flow through the aliquot tube 120. It is noted that in FIG. 4, there are two interfaces 197 and 198 where faces of the two stator parts 174, 184 lie facewise adjacent to corresponding faces of the rotor 180.

Mechanical pressure is applied to press the stack of parts 174, 180, 184 together, to prevent leakage. The rotor 180 can be rotatably mounted by a shaft (not shown) extending through a hole 196 in the rotor. Such shaft can extend through corresponding holes in the two stator parts, although the stator parts are prevented from rotating.

The rotor 180 can be referred to as a shuttle that pivots by the angle A about the axis 199, with the shuttle repeatedly moving back and forth between its first and second positions. It is also possible to slide a shuttle along a straight line (with or without turning) between two shuttle positions.

FIG. 5 shows a transfer module 200 that includes a single stator part 202 and a single rotor 204 that lie facewise adjacent at a single interface 205. In this case, the aliquot passage 206 has opposite ends 210, 212 that both open to the single stator 202. Flowthrough tube 230 is similar constructed. The primary stream is shown at 214 while the main path is shown at 216. The secondary stream secondary path are shown at 220, 222.

FIGS. 6–8 show a transfer module 250 that applicant has built and successfully tested, which has additional advantages over the prior art. FIG. 6 shows that the transfer module includes a stator 252 and a shuttle or rotor 254. The stator has a proximal face 256 which is pressed facewise against a proximal face 258 of the rotor. The stator has two primary passages 260, 262 which carry fluid at high flow rates. The primary stream 24 passes into the first primary passage 260, and perhaps 99% or more of it passes out through the second primary passage 262 to flow along the main path 106 to a receiver. A pair of secondary passages 270, 272 are provided in the stator, wherein the first one 270 carries the second stream 130 of carrier fluid from a pump. The second secondary passage 272 is connected to the secondary path 104 which leads to the mass spectrometer or other analyzing device.

The rotor 254 has an aliquot passage 280 with opposite end portions 282, 284 which can be moved between the first position at 280 and a second position at 280A which is spaced by angle A such as 60° from the first position. When the aliquot passage is in the first position at 280, it receives fluid passing along the primary stream. When the aliquot passage moves to the second position at 280A, carrier fluid pumped in along the secondary stream 130 pushes out the contents of the aliquot passage to flow it out through the second secondary passage 272 and along the secondary path 104.

FIG. 7 shows that the primary passages 260, 262 merge at a bypass 290 that is located in the stator 252. This allows a high flow rate between the primary passages 260, 262 and very rapidly sweeps out the contents of the aliquot passage 280 and fills it with fluid from the primary stream 24. After the aliquot passage 280 has remained for a short time in its first position shown in FIG. 7, the rotor 254 is turned to the second position where the contents of the aliquot passage can be flowed along the secondary path.

FIG. 8 shows the shape of the bypass 290 at the proximal face 256 of the stator. The shape of the bypass at the face 256 is somewhat like a figure eight. The aliquot passage is shown in its first position at 280. It is noted that the aliquot passage could have other orientations such as shown at 280C, and still the aliquot passage would quickly fill with primary stream fluid. With the aliquot passage in the orientation 280, it can be seen that when the rotor is turned to the second position so the aliquot passage is at 280A, then opposite end portions of the passage will be aligned with ends 270*e*, 272*e* of the two secondary passages 270, 272 in the stator for rapid flowout of the fluid in the aliquot passage.

In FIG. 6, the opposite end portions 282, 284 of the aliquot passage lie on concentric circles 291, 292 of different diameters, and the rotor turns about an axis 294. With the bypass arrangement of FIGS. 6–8, the aliquot passage is very rapidly filled with fluid in its first position. This allows rapid cycling of the rotor or shuttle, at a back and forth rate such as every 0.5 second, or even faster. This arrangement also assures that also all fluid in the aliquot passage will be changed every time the passage returns to the first position.

Figure 9:
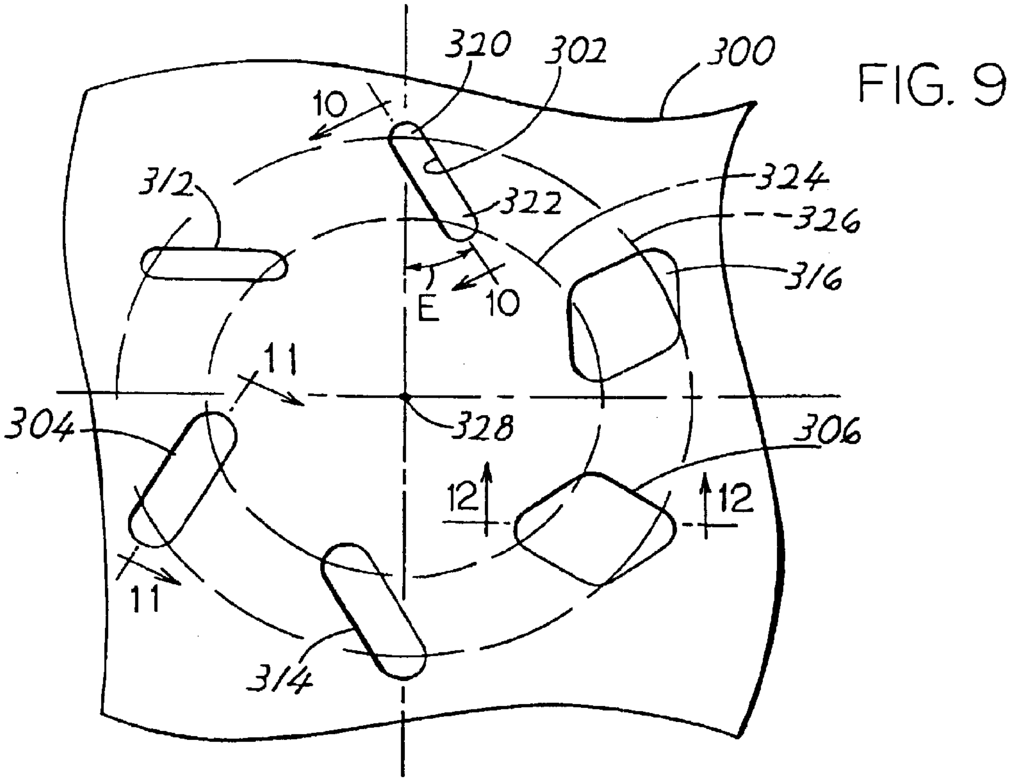
FIG. 9 is a front elevation view of a face of a shuttle of another embodiment of the invention.
Figure 10:
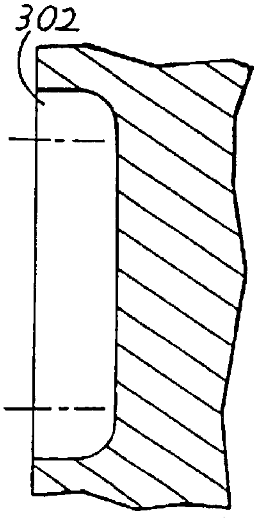
FIG. 10 is a sectional view taken on line 10—10 of FIG. 9.
Figure 11:
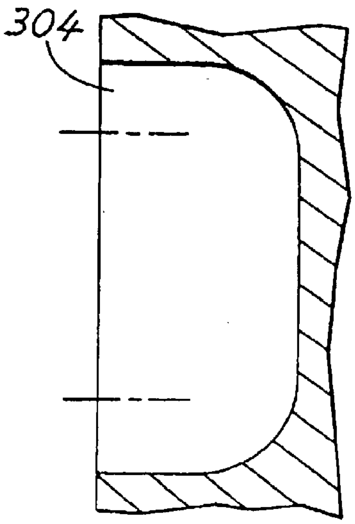
FIG. 11 is a sectional view taken on line 11—11 of FIG. 9.
Figure 12:
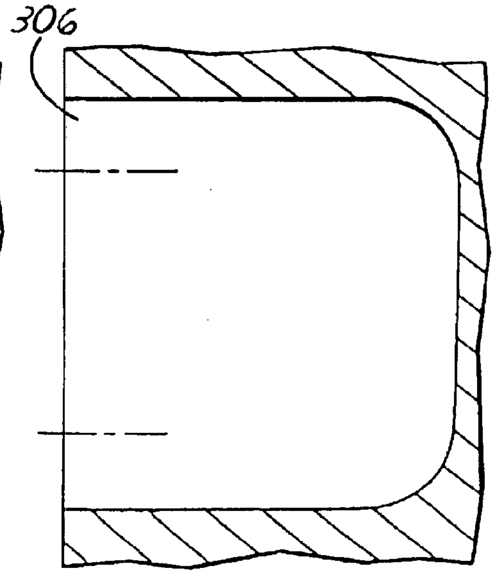
FIG. 12 is a sectional view taken on line 12—12 of FIG. 9.

FIG. 9 shows a portion of a modified rotor 300, which includes three different aliquot passages 302, 304 and 306. The rotor has three corresponding flowthrough passage 312, 314 and 316. Each aliquot passage such as 302 has opposite end portions 320, 322 that lie on concentric circles 324, 326 with a center at 328. In FIG. 9, each of the aliquot passages such as 302 extends at an incline E of 30° from a radial direction, to provide a longer distance between the opposite end portions, so as to reduce leakage. In a transfer module with a rotor of the construction shown in FIG. 9 that applicant has successfully tested, the first aliquot passage 302 had a width of 8 mils (1 mil equals one thousandth inch), a length of 36 mils, and a depth of 6 mils. This resulted in an aliquot passage capacity of 22 nL (nanoliters). The second aliquot passage 304 had a width of 12 mils, a length of 40 mils, and a depth of 15 mils, for a capacity of 100 nL. The third aliquot passage 306 was largely in the form of a rhombus with curved corners. The capacity of the third aliquot passage 306 was 360 nL.

The provision of a plurality of aliquot passages of widely differing storage capacity, where one has more than twice the storage capacity of another, enables large adjustments in the flow rate along the secondary path to the spectrometer, while maintaining a rapid cycling of the rotor or other shuttle between its first and second positions. Rapid cycling is useful to assure that the analyte being analyzed by the mass spectrometer is the same as the analyte detected by the zone detector, by assuring that there is a minimum time difference between the same analyte reaching each of them.

Although applicant has described the rotor or shuttle being moved between two positions while the stator remains stationary, it is possible to instead move the stator and keep the rotor stationary relative to a table top or the like. However, this would require movement of the ends of the tubes that connect to such moving stator, which can result in multiple flexing and fatigue failure of such tubes unless precautions are taken to prevent this. It is also noted that it is possible to move the rotor or other shuttle between more than two different positions in use, although there is generally no good reason to do so.

FIG. 13 shows a portion of a transfer module 350 that is somewhat similar to that of FIGS. 6–8, but with the interface 352 being a cylindrical face centered on an axis 354, instead of being a flat face. The rotor 356 forms the aliquot passage 360 and flowthrough passage 362. In the first position at 360, primary passages 364, 366 merge at a bypass 370 that is in communication with the aliquot passage 360. In the second position where the aliquot passage 360 assumes the position at 362, opposite end portions of the aliquot passage are aligned with secondary passages 372, 374.

Thus, the invention provides an improvement for a system where fluid is moved from a chromatographic column or similar separating device to a receiver, and that efficiently transfers a small portion of the fluid to a mass spectrometer or similar analyzing device. The system includes a transfer module with a stator and with a rotor or other shuttle. The shuttle has an aliquot passage that moves from a first position wherein at least a portion of the aliquot passage is aligned with one of the primary passages to receive fluid that is passing out of the chromatographic column or other separating device to at least partially fill the analyte passage. In the second shuttle position, end portions of the shuttle are aligned with end portions of secondary passages, to allow a carrier fluid to be pumped through the aliquot passage and thereby pump the contents of the passage to the spectrometer or other analyzing device. The stator can include a single part that forms a single interface with the shuttle. The stator can form a bypass where the two primary passages intersect, and with the bypass open to the interface to rapidly fill the aliquot passage while enabling rapid flow through the primary passages.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A fluid transfer module for transferring a sample slug of dissolved analytes from of a high rate primary stream of dissolved analytes to a secondary stream leading to an analyzer for analysis of the analyte, said transfer module comprising:

a stator device having a first stator face, and defining a primary passage extending along a primary path therethrough from an inlet end portion to an opposite outlet end portion thereof for passage of the primary stream of analytes continuously therethrough, said primary path intersecting said first stator face at a communication opening of the primary passage for fluid communication thereof, an upstream secondary passage extending along a secondary path through said stator device, and including a first communication port disposed at said first stator face, and a downstream secondary passage extending further along the secondary path, and including a second communication portion disposed at said first stator face and configured for fluid communication with the analyzer;

a rotor device having a rotor face in fluid-tight contact against said first stator face at an interface between, said rotor face defining an aliquot channel in fluid communication with said interface, wherein, in a first rotor position, said aliquot channel is aligned in fluid communication with said communication opening of the primary passage to acquire a sample slug of analyte therein, and in a second rotor position, said aliquot channel is aligned with both said first communication port of the upstream secondary passage and second communication port of the downstream secondary passage to enable transfer of substantially all of the sample slug in a uniform flow manner through the downstream secondary stator passage to the analyzer.

2. The transfer module described in claim 1, wherein said primary passage has a transverse cross-sectional dimension greater than that of the secondary passages.

3. The transfer module described in claim 1, wherein said rotor face further includes a flowthrough channel in fluid communication with said interface such that, in said first rotor position, one portion of the flowthrough channel is aligned with said first communication port of the upstream secondary passage and another portion of the flowthrough channel is aligned with said second communication port of the downstream secondary passage to enable the passage of a carrier fluid along the secondary path.

4. The transfer module described in claim 1, wherein said primary passage includes a first primary passage portion containing the inlet end portion on one end thereof, and an opposite first communication port terminating at said first stator face and forming a portion of said communication opening, and includes a second primary passage portion containing the outlet end portion on one end thereof, and an opposite second communication port terminating at said first stator face and forming another portion of said communication opening.

5. The transfer module described in claim 4, wherein said first primary passage and said second primary passage intersect at a juncture to enable said continuous flow the primary stream along the primary path.

6. The transfer module described in claim 5, wherein said primary passage is substantially V-shaped having said communication opening disposed substantially at an apex portion thereof.

7. The transfer module described in claim 6, wherein said stator device further includes a second stator face spaced apart from said first stator face, said inlet end portion and said outlet end portion terminating at said second stator face.

8. The transfer module described in claim 7, wherein said first primary passage portion and said second primary passage portion intersect one another an acute angle relative one another.

9. The transfer module described in claim 7, wherein said upstream secondary passage including an inlet port, opposite said first communication port, and disposed at said second stator face, and said downstream secondary passage including and outlet port, opposite said second communication port, and disposed at said second stator face.

10. The transfer module described in claim 1, wherein said first stator face and said rotor face are substantially planar, forming a substantially planar interface therebetween.

11. The transfer module described in claim 10, wherein said rotor face is adapted to rotate about a rotational axis oriented substantially perpendicular to said interface plan, between the first position and the second position.

12. The transfer module described in claim 11, wherein said rotor face defines a plurality of aliquot channels, each in fluid communication with said interface, and each having a discrete volume different from one another; and wherein, in a discrete one of first rotor positions, a respective one of the plurality of aliquot channels is aligned in fluid communication with said communication opening of the primary passage to acquire a sample slug of analyte therein, and in a discrete one of second rotor position, the respective one aliquot channel is aligned with both said first communication port of the upstream secondary passage and said second communication port of the downstream secondary passage to enable transfer of substantially all of the sample slug in a uniform flow manner through the downstream secondary stator passage to the analyzer.

13. The transfer module described in claim 1, wherein said rotor face is substantially circular shaped and faces outwardly, and said first stator face is substantially circular shaped and faces inwardly, opposite said rotor face such that said interface therebetween is annular-shaped, having a longitudinal axis oriented substantially co-axial with a rotational axis of said rotor face.

14. The transfer module describe in claim 1, wherein said aliquot channel it substantially linear, and disposed in said rotor face such that said aliquot channel is substantially continuously open to said interface from one side portion of the channel to the another side portion thereof.

15. The transfer module described in claim 14, wherein said first communication port is spaced-apart from said second communication port, and said aliquot channel is dimensioned and oriented such that, in said second position, said one side portion of the aliquot channel is in fluid communication with said first communication port, and said another side portion thereof is in fluid communication with said second communication port.

16. The transfer module describe in claim 1, wherein said first communication port of said upstream secondary passage is spaced-apart from, and independent of, said second communication port of said downstream secondary passage, and said aliquot channel extends through said rotor device having an upstream opening and a spaced-apart, independent, downstream opening, such that, in said first position, said upstream opening and said downstream opening are both aligned with said communication opening of said primary passage, and in said second position, said upstream opening is aligned with said first communication port of said upstream secondary passage and said downstream opening is aligned with said second communication port of the downstream secondary passage.

17. The transfer module described in claim 1, further including:

a source of high pressure fluid that includes a mixture of said analytes with a mobile phase fluid, said source connected to said primary stream to flow to said primary passage.

18. The transfer module described in claim 1, further including:

an actuator device coupled to said rotor device for selective rotational movement of said rotor face between said first position and said second position.

19. The transfer module described in claim 18, wherein said rotor face further includes a flowthrough channel in fluid communication with said interface such that, in said first rotor position, one portion of the flowthrough channel is aligned with a respective communication port of one secondary passage and another portion of the flowthrough channel is aligned with a respective communication port of the other secondary passages to enable the passage of a carrier fluid through the pair of secondary passages.

20. The transfer module described in claim 19, wherein said pair of primary passages intersect one another an acute angle.

21. The transfer module described in claim 20, wherein the other of said secondary passages includes an outlet port disposed at said second stator face for the outlet flow of the carrier fluid therethrough to the analyzer, and the one of said secondary passages includes an inlet port disposed at said second stator face for the inlet flow of the carrier fluid therethrough to the respective communication port.

22. The transfer module described in claim 21, wherein said rotor face is adapted to rotate about a rotational axis oriented substantially perpendicular to said interface plane, between the first position and the second position.

23. The transfer module described in claim 18, wherein said pair of primary passage collectively form a substantially V-shaped primary path through said stator device, having said communication openings merged together and disposed substantially at an apex portion thereof.

24. The transfer module described in china 18, wherein said first stator face and said rotor face are substantially planar, forming a substantially planar interface therebetween.

25. The transfer module described in claim 24, wherein said rotor face defines a plurality of aliquot channels, each in fluid communication with said interface, and each having a discrete volume different from one another; and wherein, in a discrete one of first rotor positions of said rotor device, a first end portion and a second end portion of a respective one of the plurality of aliquot channels is aligned in fluid communication with a respective communication opening of said primary passages for fluid communication with said primary stream to acquire a sample slug of analyte therein, and in a discrete one of second rotor position of said rotor device, said first end portion and said second end portion of the respective one aliquot channel is aligned with a respective communication port of said secondary passages to enable transfer of substantially all of the sample slug in a uniform flow manner through the one secondary passage to the analyzer.

26. The transfer module described in claim 25, wherein said rotor face defines a plurality of aliquot channels, each in fluid communication with said interface, and each having a discrete volume different from one another; and wherein, in a discrete one of first rotor positions of said rotor device, a first end portion and a second end portion of a respective one of the plurality of aliquot channels is aligned in fluid communication with a respective communication opening of said primary passages for fluid communication with said primary stream to acquire a sample slug of analyte therein, and in a discrete one of second rotor position of said rotor device, said first end portion and said second end portion of the respective one aliquot channel is aligned with a respective communication port of said secondary passages to enable transfer of substantially all of the sample slug in a uniform flow manner through the one secondary passage to the analyzer.

27. The transfer module described in claim 26 wherein the respective communication ports of the pair of secondary passages are spaced-apart from one another, and said aliquot channel is dimensioned and oriented such that, in said second position, the first and second end portions of the aliquot channel are in fluid communication with a respective communication port of the pair of secondary passages.

28. The transfer module described in claim 18, wherein said rotor face is substantially circular shaped and faces outwardly, and said first stator face is substantially circular shaped and faces inwardly, opposite said rotor face such that said interface therebetween is annular-shaped, having a longitudinal axis oriented substantially co-axial with a rotational axis of said rotor face.

29. The transfer module described in claim 18, wherein said aliquot channel is substantially linear, and disposed in said rotor face such that said aliquot channel substantially continuously open to said interface from the first end portion to the second end portion of the channel.

30. The transfer module described in claim 18, wherein said communication ports of said pair of secondary passages are spaced-apart from, and independent of, one another, and said aliquot channel extends through said rotor device having the first end portion thereof spaced-apart from, and independent of, the second end portion thereof, such that, in said first position, said first end portion and said second end portion of the channel are both aligned with the respective communication openings of the pair of primary passages, and in said second position, said first end portion and said second end portion of the channel are both aligned with the respective communication port of the pair of secondary passages.

31. A fluid transfer module for transferring a sample slug of dissolved analytes from of a high flow rate primary stem of dissolved analytes to a secondary steam in flow communication with an analyzer for analysis of the sample slug of analyte, said transfer module comprising:

a stator device having a first stator face, and defining a pair of primary passages and a pair of secondary passages, said primary passages intersecting in said stator device at a bypass juncture to collectively define a primary path therethrough that enables the continuous flow of the primary steam, and each said primary passage having a communication opening terminating at said first stator face for fluid communication therewith, and said secondary passages each bring a communication port terminating at said first stator face for fluid communication therewith, and on of said secondary passages being adapted for fluid communication with said analyzer; and a rotor device having a rotor face in fluid-tight contact against said first stator face, said rotor face defining an aliquot channel having a first end portion and an opposite second end portion, and said rotor face being movable between a discrete first portion and a discrete second position relative to said first stator face;

wherein, in said first position of said rotor device, said first end portion and said second end portion of said aliquot channel being aligned with a respective communication opening of said primary passages for fluid communication with said primary stream to acquire a sample slug of analyte therein, and, in said second position of said rotor device, said first end portion and said second end portion of said aliquot channel being aligned with a respective communication port of said secondary passages to enable transfer of substantially all of tho sample slug in a uniform flow manner through the one secondary passage to the analyzer.

32. The transfer module described in claim 31, wherein said stator device further includes a second stator face spaced-apart from said first stator face, and said pair of primary passages and said pair of secondary passages extend therethrough from said first stator face to said second stator face.

* * * * *